United States Patent [19]

Lin

[11] Patent Number: 5,681,126
[45] Date of Patent: Oct. 28, 1997

[54] REINFORCING BAR CONNECTING DEVICE

[76] Inventor: Hsia-Sen Lin, No. 27, Ing Min 1 Lane, Tao Ing Road, Bar Der City, TaoYuan, Taiwan

[21] Appl. No.: 607,394

[22] Filed: Feb. 27, 1996

[51] Int. Cl.$^6$ ................................. F16B 7/04; E04C 5/16
[52] U.S. Cl. ..................... 403/313; 52/726.1; 52/740.1; 403/292; 403/344
[58] Field of Search ................... 52/726.1, 740.1; 403/292, 294, 309, 310, 311, 313, 344

[56] References Cited

U.S. PATENT DOCUMENTS

| | | | |
|---|---|---|---|
| 393,326 | 11/1888 | Fee | 403/344 X |
| 1,219,382 | 3/1917 | Dunlap | 403/344 X |
| 1,853,681 | 4/1932 | Hayes | 403/311 X |
| 2,001,215 | 5/1935 | Ruppel | 403/313 X |
| 2,557,472 | 6/1951 | Rulon | 403/313 X |
| 3,491,182 | 1/1970 | Hunder et al. | 403/311 X |
| 3,982,779 | 9/1976 | Hickey | 403/311 X |
| 4,082,324 | 4/1978 | Obrecht | 403/309 X |
| 4,114,344 | 9/1978 | Heasman | 403/313 X |
| 4,360,213 | 11/1982 | Rudwick et al. | 403/313 X |
| 4,367,871 | 1/1983 | Schiefer | 403/294 X |
| 4,469,465 | 9/1984 | Andrus | 403/313 X |
| 4,473,024 | 9/1984 | Armstrong | 403/344 X |
| 4,832,361 | 5/1989 | Nakao et al. | 403/344 X |
| 4,839,472 | 6/1989 | Pichler | 403/313 X |
| 5,320,053 | 6/1994 | Beasley | 403/344 X |
| 5,367,945 | 11/1994 | Halka et al. | 403/294 X |
| 5,385,373 | 1/1995 | Love | 403/313 X |

FOREIGN PATENT DOCUMENTS

| | | | |
|---|---|---|---|
| 120032 | 6/1945 | Australia | 403/310 |
| 2675546 | 10/1992 | France | 403/292 |

*Primary Examiner*—Anthony Knight
*Assistant Examiner*—Andrea Chop
*Attorney, Agent, or Firm*—Bacon & Thomas

[57] ABSTRACT

A reinforced bar connecting device fastened to two reinforcing bars to secure them in a line, including two plug members, and two symmetrical, smoothly arched coupling plates mounted around the reinforcing bars and abutted against each other and secured in place by the plug members to hold down the reinforcing bars, each of the coupling plate having a left longitudinal side edge, a right longitudinal side edge, and two longitudinal slots respectively made along the left longitudinal side edge and the right longitudinal side edge, each of the plug member being inserted into one longitudinal slot of each of the coupling plates.

3 Claims, 4 Drawing Sheets

REINFORCING BAR CONNECTING DEVICE

BACKGROUND OF THE INVENTION

The present invention relates to connecting devices, and relates more particularly to a reinforcing bar connecting device for connecting two reinforcing bars in a line.

A reinforcing bar connecting device is for connecting two reinforcing bars in a line. FIG. 1 shows a reinforcing bar connecting device according to the prior art, which has two threaded, conical holes at two opposite ends respectively connected to the reinforcing bars. The reinforcing bars have a respective outer thread at one end respectively threaded into the threaded, conical holes of the connecting device. This installation procedure is complicated.

SUMMARY OF THE INVENTION

It is one object of the present invention to provide a reinforcing bar connecting device which can be quickly installed to connect two reinforcing bars in a line. It is another object of the present invention to provide a reinforcing bar connecting device which firmly secures two reinforcing bars in a line. According to one aspect of the present invention, the reinforcing bar connecting device comprises two plug members, and two symmetrical, smoothly arched coupling plates mounted around the reinforcing bars and abutted against each other and secured in place by the plug members to hold down the reinforcing bars, each of the coupling plate having a left longitudinal side edge, a right longitudinal side edge, and two longitudinal slots respectively made along the left longitudinal side edge and the right longitudinal side edge, each of the plug member being inserted into one longitudinal slot of each of the coupling plates. According to another aspect of the present invention, each of the coupling plates has a plurality of transverse grooves spaced between the left side edge and the right side edge at different elevations and forced into engagement with respective ribs raised around the periphery of the reinforcing bars. According to still another aspect of the present invention, each of the two longitudinal slots of each of the coupling plates defines a longitudinal mouth and has two longitudinal stop flanges disposed at two opposite sides of the longitudinal mouth; each of the plug members comprises two parallel plug rods respectively inserted into one longitudinal slot of each of the coupling plates and stopped inside the respective mouths by the respective longitudinal stop flanges. According to still another aspect of the present invention, the two plug rods of each of the plug member have a respective first end and a respective second end, the first ends of the two plug rods of each of the plug members being joined by a head, the second end of each of the two plug rods of each of the plug members having a flange and at least one longitudinal split at the flange. According to still another aspect of the present invention, the coupling plates have a respective inside wall coated with a bonding agent.

DETAILED DESCRIPTION OF THE PREFERRED EMBODIMENT

Figure 1:
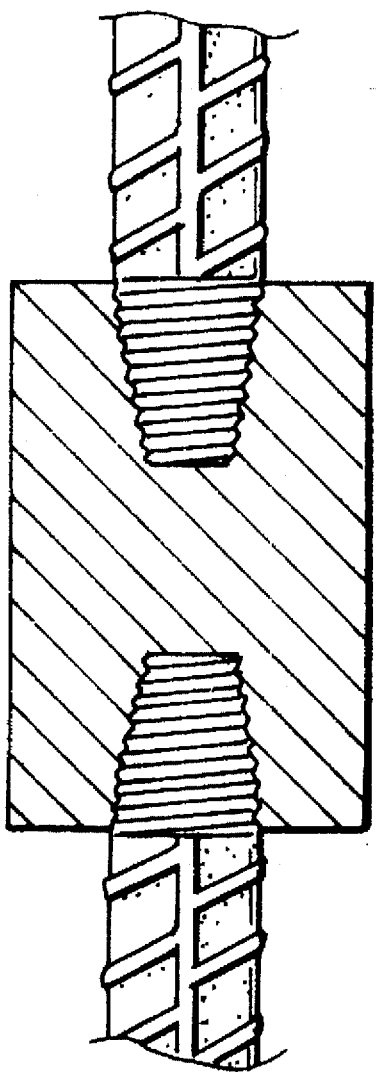
FIG. 1 shows two reinforcing bars connected at two opposite ends of a reinforcing bar connecting device according to the prior art.
Figure 2:
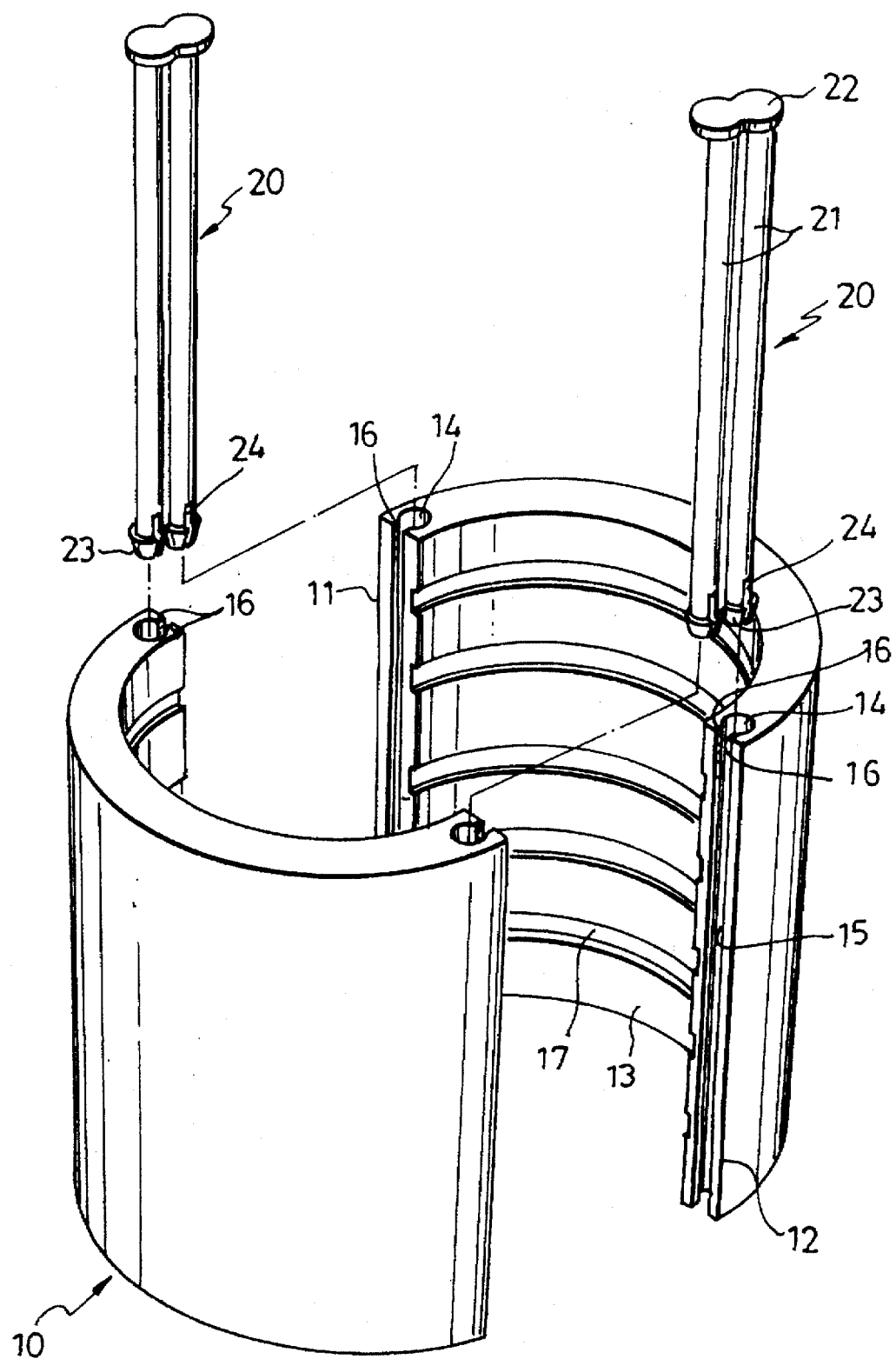
FIG. 2 is an exploded perspective view of a reinforcing bar connecting device according to the present invention.

Referring to FIG. 2, a reinforced bar connecting device in accordance with the present invention is generally comprised of two symmetrical, smoothly arched coupling plates 10, and two plug members 20. Each of the coupling plates 10 comprises a left longitudinal side edge 11, a right longitudinal side edge 12, an inside wall 13 between the left longitudinal side edge 11 and the right longitudinal side edge 12, two longitudinal slots 14 respectively made along the left longitudinal side edge 11 and the right longitudinal side edge 12 and defining a respective longitudinal mouth 15, two pairs of opposite longitudinal stop flanges 16 respectively and bilaterally disposed at the mouths 15 of the longitudinal slots 14, and a plurality of transverse grooves 17 made on the inside wall 13 at different elevations between the left longitudinal side edge 11 and the right longitudinal side edge 12. Each of the plug members 20 comprises a head 22, and two plug rods 21 respectively extending from the head 22 in a parallel relation. Each of the plug rods 21 has a flanged tip 23 and at least one longitudinal split 24 at the flanged tip 23.

Figure 3:
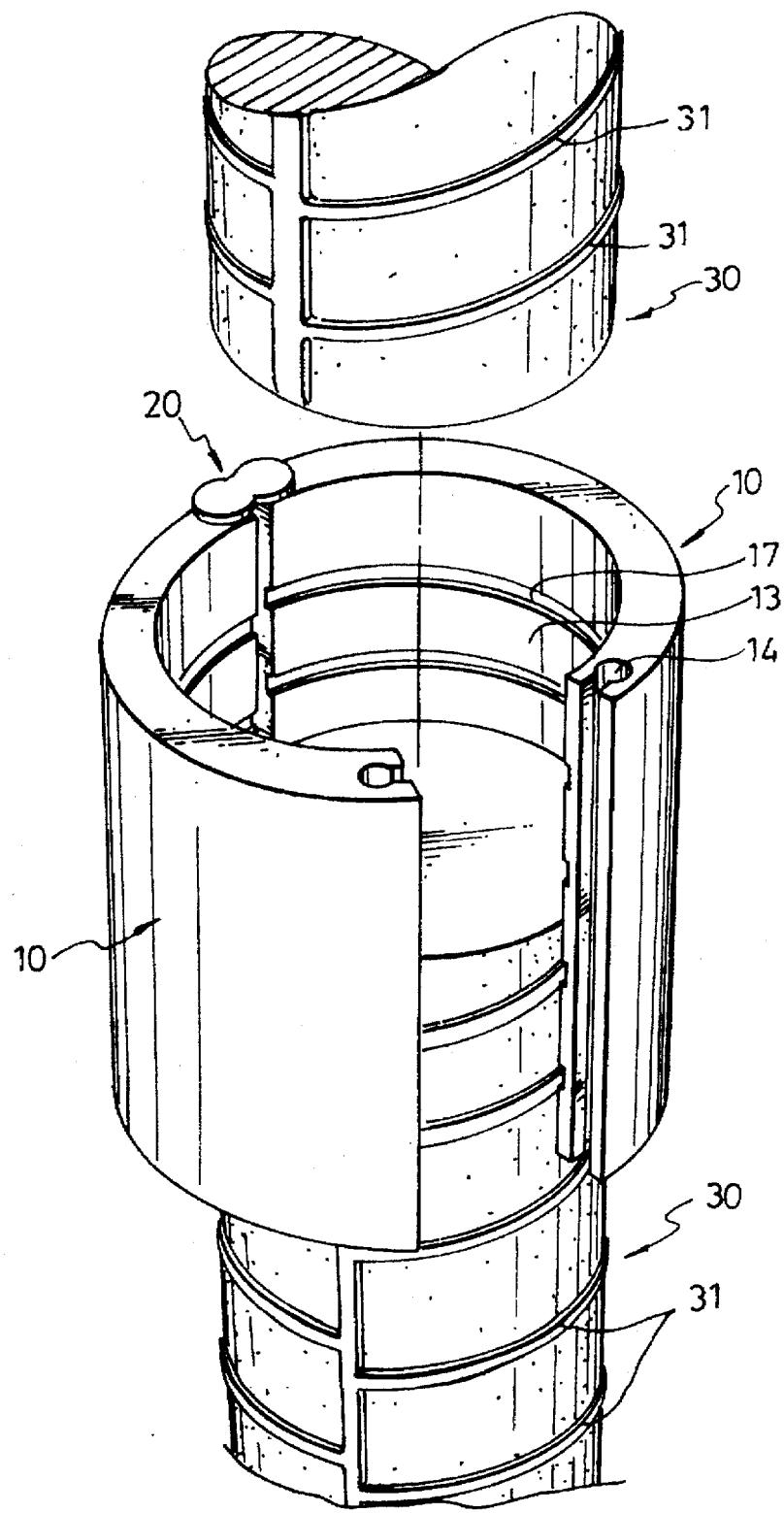
FIG. 3 is a partially exploded perspective view of the present invention.
Figure 4:
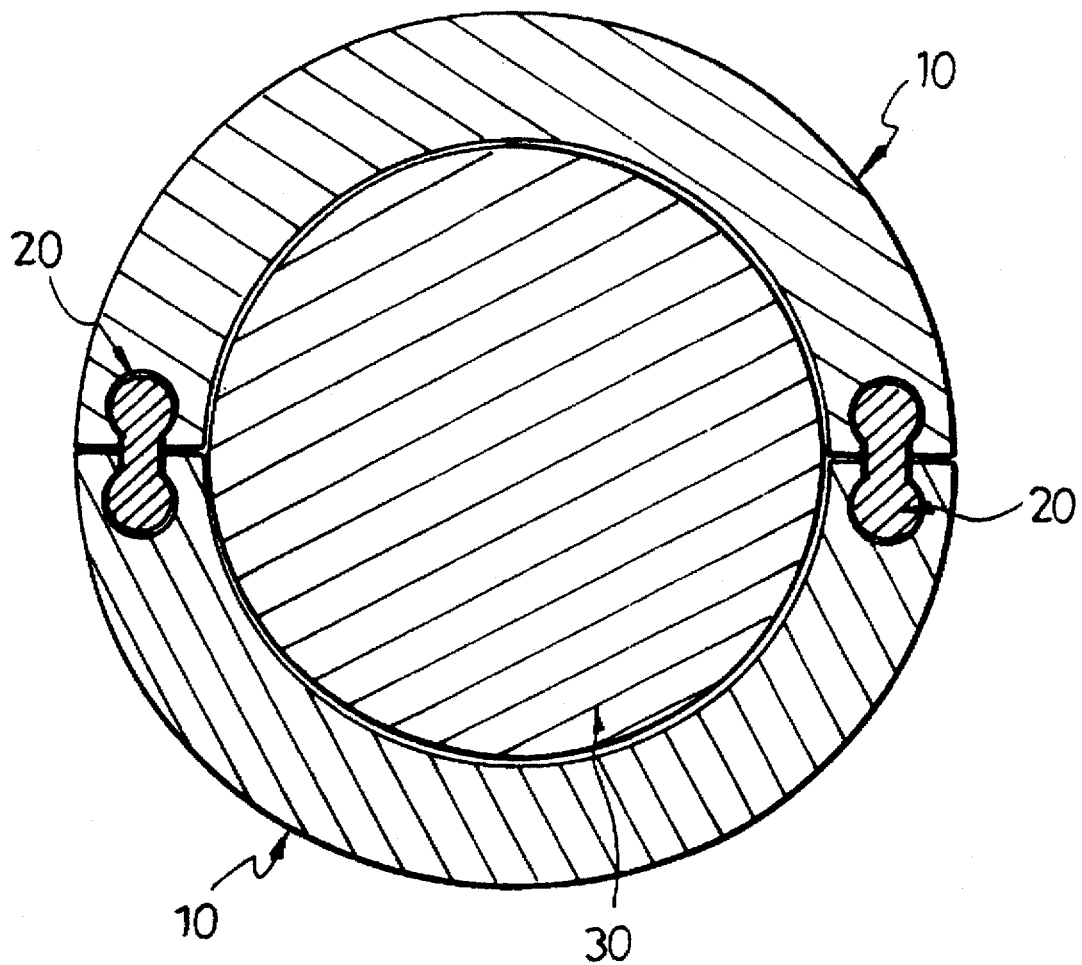
FIG. 4 is a cross sectional view showing the reinforcing bar connecting device installed according to the present invention.

Referring to FIGS. 3 and 4, the two reinforcing bars 30 are connected in a line by the reinforcing bar connecting device by inserting the plug rods 21 of the plug members 20 into the longitudinal slots 14 of the coupling plates 10 and forcing the peripheral ribs 31 of the reinforcing bars 30 into engagement with the transverse grooves 17 of the coupling plates 10. Because the flanged tip 23 of each of the plug rods 21 of each of the plug members 20 has longitudinal splits 24, it can be compressed inwardly and then inserted through the longitudinal slot 14 at one side of one of the coupling plates 10. When passed through the longitudinal slot 14, the flanged tip 23 immediately returns to its former shape to engage with the bottom edge of the respective coupling plate 10 while the head 22 of the respective plug member 20 is stopped at the top of the respective coupling plate 10. Because there are two opposite longitudinal stop flanges 16 bilaterally disposed at each longitudinal mouth 15, the two plug rods 21 of each plug member 20 are respectively stopped within the respective longitudinal slots 14 by the respective longitudinal stop flanges 16 when they are inserted into the respective longitudinal slots 14.

While only one embodiment of the present invention has been shown and described, it will be understood that various modifications and changes could be made without departing from the spirit and scope of the invention disclosed.

What the invention claimed is:

1. A reinforcing bar connecting device for securing the ends of two reinforcing bars together in a line, the device comprising:

a) a pair of plug members, each plug member including two parallel plug rods, each plug rod of each plug member having a first end and a second end, the first ends of the plug rods of each plug member being joined by a head, and the second end of each plug rod having a flange and at least one longitudinal split at the flange;

b) a pair of symmetrical smoothly arched coupling plates for mounting around the ends of two reinforcing bars and for disposing the ends of the bars in abutting relationship with each other; and c) each coupling plate including a left longitudinal side and a right longitudinal side, a longitudinal slot formed along each of the left and right longitudinal sides, each plug rod of each plug member being engageable within a longitudinal slot of each of the coupling plates for securing the coupling plates and the ends of the reinforcing bars together.

2. The connecting device of claim 1 wherein each coupling plate further includes a plurality of transverse grooves formed between the left and right longitudinal sides, the grooves being spaced at different elevations for engaging corresponding raised ribs formed around the peripheries of the reinforcing bars.

3. The connection device of claim 1 wherein each longitudinal slot of the coupling plate includes a mouth portion and a pair of longitudinal stop flanges disposed on two opposite sides of the mouth portion.

* * * * *